US007643828B2

(12) United States Patent
Malladi et al.

(10) Patent No.: US 7,643,828 B2
(45) Date of Patent: Jan. 5, 2010

(54) METHOD AND APPARATUS FOR FAST LINK SETUP IN A WIRELESS COMMUNICATION SYSTEM

(75) Inventors: Durga Prasad Malladi, San Diego, CA (US); Francesco Grilli, San Diego, CA (US); Serge Willenegger, Onnens (CH)

(73) Assignee: Qualcomm, Inc., San Diego, CA (US)

( * ) Notice: Subject to any disclaimer, the term of this patent is extended or adjusted under 35 U.S.C. 154(b) by 0 days.

(21) Appl. No.: 11/505,050

(22) Filed: Aug. 15, 2006

(65) Prior Publication Data

US 2006/0276181 A1    Dec. 7, 2006

Related U.S. Application Data

(63) Continuation of application No. 10/613,393, filed on Jul. 2, 2003, now Pat. No. 7,120,443.

(60) Provisional application No. 60/469,976, filed on May 12, 2003.

(51) Int. Cl.
*H04Q 7/20* (2006.01)

(52) U.S. Cl. .................. 455/435.1; 455/436; 455/445; 455/432.1

(58) Field of Classification Search .............. 455/453.2, 455/435.3, 439, 442, 445, 452.2
See application file for complete search history.

(56) References Cited

U.S. PATENT DOCUMENTS 5,926,469 A * 7/1999 Norstedt et al. ............. 370/329

| 6,167,248 | A | 12/2000 | Hamalainen et al. |
| 6,178,337 | B1 | 1/2001 | Spartz et al. |
| 6,314,292 | B1 * | 11/2001 | Ho et al. ............... 455/450 |
| 6,366,779 | B1 | 4/2002 | Bender et al. |
| 6,690,679 | B1 | 2/2004 | Turunen et al. |
| 2001/0021180 | A1 | 9/2001 | Lee et al. |
| 2002/0057667 | A1 | 5/2002 | Hamalainen et al. |
| 2004/0219921 | A1 * | 11/2004 | Cao et al. ............... 455/444 |

FOREIGN PATENT DOCUMENTS

WO    02030134    11/2002

OTHER PUBLICATIONS

3GPP2: "Fast Call Setup, System Requirements" *3GPP2 S. R0065 Version 1.0* 'Online! Apr. 15, 2002, pp. 1-6, XP002301440.

* cited by examiner

*Primary Examiner*—Lester Kincaid
*Assistant Examiner*—Dai A Phuong
(74) *Attorney, Agent, or Firm*—Won Tae C. Kim; Howard Seo

(57) ABSTRACT

A method and apparatus for a communication system provide for fast link setup for a mobile station by transmitting a request message, transmitting an assignment message from the base station to the mobile station, and transmitting a notification message from the base station to a base station controller. The mobile station transmits an indication message to the base station controller indicating a successful completion of acquiring the data packet channel. The base station controller processes the indication message for message integrity and security feature. A portion of the available communication resources at the base station is allocated for an immediate response to the request message for acquiring a data packet channel.

18 Claims, 3 Drawing Sheets

METHOD AND APPARATUS FOR FAST LINK SETUP IN A WIRELESS COMMUNICATION SYSTEM

CLAIM OF PRIORITY UNDER 35 U.S.C. §120

The present Application for Patent is a continuation application of U.S. patent application Ser. No. 10/613,393 entitled "Method and Apparatus for Fast Link Setup in a Wireless Communication System" filed Jul. 2, 2003, now U.S. Pat. No. 7,120,443 now allowed, which claims priority to U.S. Provisional Application Ser. No. 60/469,976, filed May 12, 2003 entitled "Method and Apparatus for Controlling and Operating State of Mobile Station in a Communication System.", and assigned to the assignee hereof and hereby expressly incorporated by reference herein.

BACKGROUND OF THE INVENTION

1. Field

The present invention relates generally to the field of communications, and more particularly, to wireless communications.

2. Background

A system of protocols normally controls the ways a mobile station and a base station may operate in a communication system. Such protocols are disclosed in a set of standards published by a recognized standard body. The protocols may define a set of procedures for setting up a communication link between a mobile station and a base station. Generally, such a procedure provides for establishing a reliable and secure communication link. The process for establishing a link may require assigning resources, such as Walsh code assignment, data rate and power level assignment, etc. In addition, the request for establishing a communication link is processed for checking for integrity of the end user device requesting establishment of the link. Moreover, the link may require having a security feature for secure communications.

A system for communications of data benefits greatly by providing a fast link set up procedure. In such a system, a mobile user is able to set up a communication link in a very short period of time, thus enhancing the user experience of the communication systems. Therefore, there is a need for providing a fast link set up in a communication system.

SUMMARY

A method and apparatus for a communication system provide for fast link setup for a mobile station by transmitting a request message, for acquiring a data packet channel, transmitting an assignment message, and transmitting a notification message from the base station to a base station controller, wherein the notification message informs the base station controller of a process for acquiring the data packet channel. The mobile station after acquiring the data packet channel transmits an indication message from the mobile station to the base station controller indicating a successful completion of acquiring the data packet channel. The base station controller processes the indication message for message integrity at the base station controller. A radio link release message is transmitted from the base station controller to the base station in response to detecting a failure of the mobile station in passing the message integrity process. The resources allocated to the acquiring the data packet channel are released in response. Furthermore, the indication message is processed for security feature at the base station controller. A radio link release message is transmitted from the base station controller to the base station in response to detecting a failure of the mobile station in passing the security feature process, and releasing the allocated resources in response. A portion of the available communication resources at the base station is allocated for an immediate response to the request message for acquiring a data packet channel.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENT(S)

Generally stated, various aspects of the invention provide for fast set up of a communication link between a base station and a mobile station in a communication system by advantageously determining a partitioning of various portions of link set up processes over a number of communication system operating entities. One or more exemplary embodiments described herein are set forth in the context of a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

More specifically, various embodiments of the invention may be incorporated in a wireless communication system operating in accordance with a communication standard outlined and disclosed in various standards published by the Telecommunication Industry Association (TIA) and other standards organizations. Such standards include the TIA/EIA-95 standard, TIA/EIA-IS-2000 standard, IMT-2000 standard, UMTS and WCDMA standard, GSM standard, all incorporated by reference herein. A copy of the standards may be obtained by writing to TIA, Standards and Technology Department, 2500 Wilson Boulevard, Arlington, Va. 22201, United States of America. The standard generally identified as UMTS standard, incorporated by reference herein, may be obtained by contacting 3GPP Support Office, 650 Route des Lucioles-Sophia Antipolis, Valbonne-France.

Figure 1:
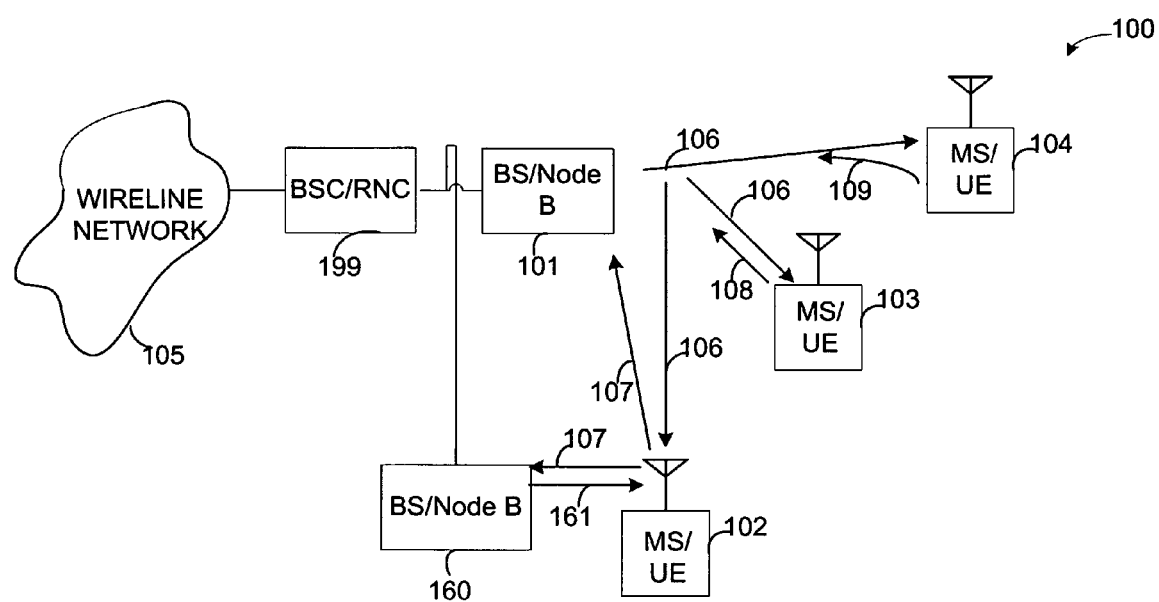
FIG. 1 illustrates a communication system capable of operating in accordance with various embodiments of the invention.

FIG. 1 illustrates a general block diagram of a communication system 100 capable of operating in accordance with any of the code division multiple access (CDMA) communication system standards and GSM standard while incorporating various embodiments of the invention. Communication system 100 may be for communications of data, or data and voice. Generally, communication system 100 includes a base station (BS) 101 that provides communication links between a number of mobile stations, such as mobile stations (MS) 102-104, and between the MS 102-104 and a public switch telephone and data network 105. In various specifications, a MS may be referred to as a user equipment (UE), and a BS as Node B. Therefore, such terms may be interchangeable without departing from various aspects of the invention. BS/Node B 101 may include a number of components, such as a base transceiver system and antenna system. For simplicity, such components are not shown.

BS/Node B 101 may be in communication with other BS/Node B, for example BS/Node B 160, through a base station controller system (BSC) 199. The BSC 199 may be referred to as radio network controller (RNC) in various standards. BSC/RNC 199 may control various operating aspects of the communication system 100 and in relation to communications over a back-haul between network 105 and BS/Node B 101 and 160. BS/Node B 101 communicates with each mobile station that is in its coverage area via a forward link signal transmitted from BS/Node B 101. The forward link signals targeted for MS/UE 102-104 may be summed to form a forward link signal 106. Each of the MS/UE 102-104 receiving forward link signal 106 decodes the forward link signal 106 to extract its intended received information. BS/Node B 160 may also communicate with the mobile stations that are in its coverage area via a forward link signal transmitted from BS/Node B 160. MS/UE 102-104 communicate with BS/Node B 101 and 160 via corresponding reverse links. Each reverse link is maintained by a reverse link signal, such as reverse link signals 107-109 for mobile stations 102-104, respectively. The reverse link signals 107-109, although may be targeted for one BS/Node B, may also be received at another BS/Node B. Various aspects of the invention provides for establishing a link between a MS/UE and a BS/Node B in a quick manner while complying with integrity and security features of the communication system 100.

Figure 2:
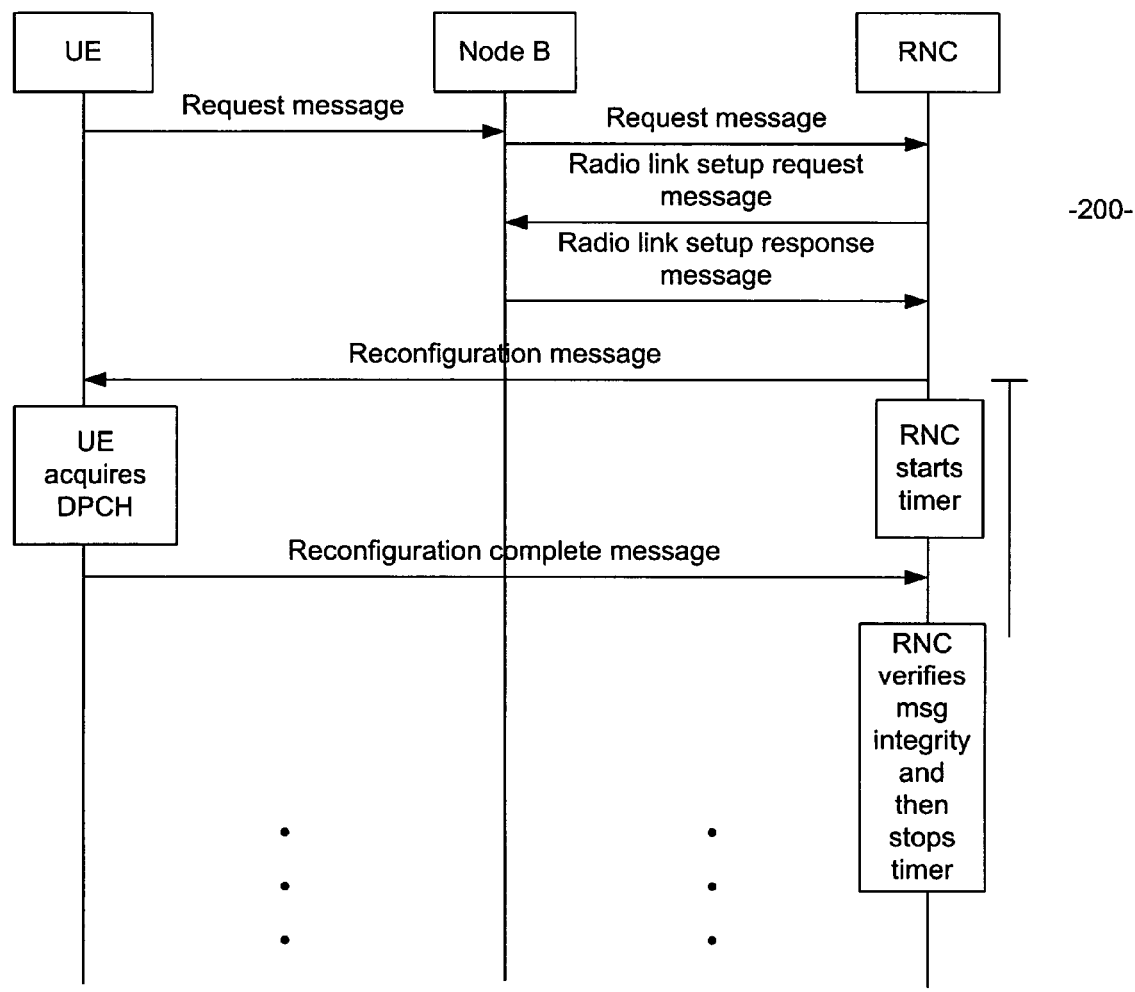
FIG. 2 depicts a flow of messages between several operating entities in a communication system for establishing a communication link.

Referring to FIG. 2, a flow chart 200 of a few exemplary messages for establishing a communication link that are communicated between a MS/UE, a BS/Node B and BSC/RNC 199 are shown. Generally, setting up a link involves at least three distinct operations. The first operation is assignment of channel resources, such as Walsh code assignment, data rate, communication layer 2 configurations, etc. The power level is typically managed and assigned by the BS/Node B directly via closed loop power control. The second operation is authenticating the request message (message integrity function) to access the system to receive communication services. The third operation is for providing security feature of the communication link. These three operations take time in the order of 100 to 400 msec. As such, establishing a link with a BS/Node B may take some time. A MS/UE may send a request to a BS/Node B to start establishing a communication link. Such a request message may be sent based on a previously received page message (not shown) from BS/Node B. The BS/Node B passes the request message to BSC/RNC. One or more communications may take place between BSC/RNC and BS/Node B for completing the process for defining all the configuration parameters necessary for establishing a communication link. The BSC/RNC generates the configuration message. The BS/Node B sends the configuration message to the MS/UE. After MS/UE receives the configuration message, the MS/UE begins a process for acquiring a data packet channel (DPCH), and generates and sends a configuration-complete message after successfully completing the process for acquiring the DPCH. In the mean time, the BSC/RNC starts a timer. The BSC/RNC generally expects to receive the configuration-complete message within a time period measured by the timer. After receiving the configuration-complete message, the BSC/RNC verifies the message integrity and stops the timer. If the integrity of the message fails, the message is discarded (ignored). If the timer expires, the BSC/RNC would send a message (not shown) to BS/Node B to terminate the link with the MS/UE. In response, BS/Node B stops transmitting to the MS/UE and stops reception on the DPCH on the reverse link. As a result the MS/UE can not use the acquired DPCH.

Figure 3:
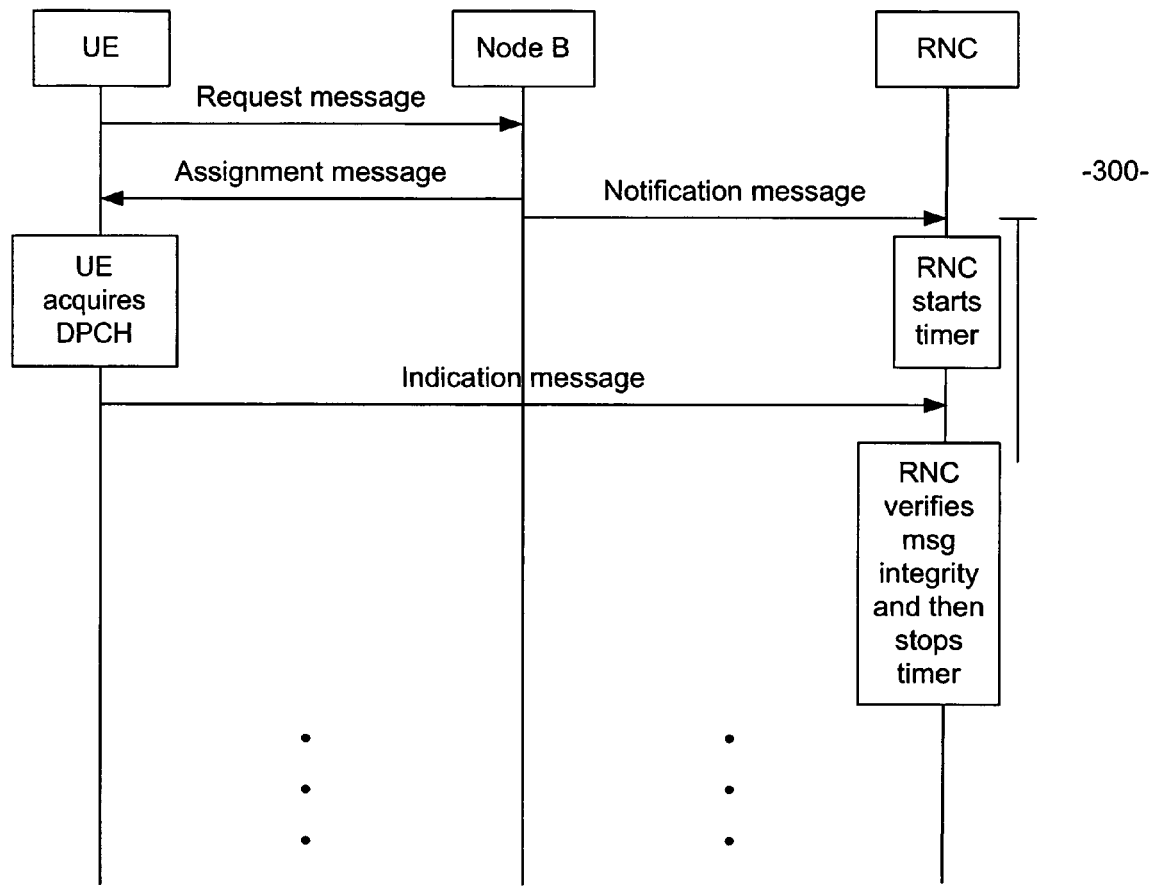
FIG. 3 depicts a flow of messages between several operating entities in a communication system for establishing a communication link in accordance with various aspects of the invention.

Referring to FIG. 3, a flow chart 300 of messages provides a flow of messages communicated between a MS/UE, BS/Node B and BSC/RNC in accordance with various aspects of the invention which allows partitioning various link set up operations for establishing a communication link in a quick manner. In accordance with various aspects of the invention, the operations of channel resource assignment, authenticating the request message and providing security features are partitioned over more than one entity in the communication system. In one exemplary embodiment, the channel resource assignment is performed by BS/Node B, while the operations of authenticating the request message through the message integrity function and providing security features are performed by BSC/RNC. The partitioned operations may run concurrently or on an overlapping time periods or at different times. In accordance with message flow 300, a MS/UE sends a request message to BS/Node B. The BS/Node B in urgency sends an assignment message to the MS/UE informing it of the assigned resources for acquiring a DPCH. At the same time or shortly after, the BS/Node B sends a notification message to BSC/RNC that the MS/UE is in the process of setting a link through acquiring a DPCH. Once the BSC/RNC receives the notification message, BSC/RNC starts a timer. The timer counts an amount of time lapsed from the time the notification message is received until an indication message is received from the MS/UE that it has successfully acquired the DPCH. Once the indication message is received, the BSC/RNC verifies the integrity, and may perform the security feature operation. If the indication message is not received from the MS/UE before the timer period expires, there is no need to perform the integrity verification and security feature operation. Moreover, if the message integrity fails, the message is discarded (ignored), and if the timer expires, the BSC/RNC sends a message to the BS/Node B to release the radio link resources assigned to the MS/UE. In such a case, the MS/UE is unable to continue the communications with BS/Node B.

In accordance with various aspects of the invention, a MS/UE may be able to set up a link through acquiring a DPCH very quickly while also allowing the BSC/RNC completing the process for verifying integrity of the MS/UE and providing security feature for the communication. Moreover, if communication resources are scarce at the time of the request from the MS/UE and the MS/UE is not able to acquire a DPCH, the unavailability of the resources may become apparent to the MS/UE in a more timely manner than if all the operations had to be performed before attempting for acquiring a DPCH. In such a case, the MS/UE may repeat sending the request message until a maximum number of such messages are sent or until an assignment message is received before exhausting the maximum number of transmissions. The processes for checking integrity and security feature are performed after receiving a notification that MS/UE has acquired a DPCH.

Base stations 101 and 160 may be simultaneously communicating to a common MS/UE. For example, MS/UE 102 may be in close proximity of BS/Node B 101 and 160, which can maintain communications with both BS/Node B 101 and 160. On the forward link, BS/Node B 101 transmits on forward link signal 106, and BS/Node B 160 on the forward link signal 161. On the reverse link, MS/UE 102 transmits on reverse link signal 107 to be received by both BS/Node B 101 and 160. For transmitting a packet of data to MS/UE 102, one of the BS/Node B 101 and 160 may be selected to transmit the packet of data to MS/UE 102. On the reverse link, both BS/Node B 101 and 160 may attempt to decode the traffic data transmission from the MS/UE 102. The data rate and power level of the reverse and forward links may be maintained in accordance with the channel condition between the base station and the mobile station. Therefore, for such a case, the BSC/RNC 199 needs to manage the communication resources of both BS/Node B 101 and 160. Accordingly, in order to maintain a level of control over the communication resources provided by the BS/Node B 101 and 160, the BSC/RNC 199 allocates a portion of the available resources in each BS/Node B for autonomous control by the BS/Node B. Such a portion of resources may be labeled as fast-setup resources. Therefore, when the BS/Node B receives a request message from a MS/UE for link set up, the BS/Node B assigns resources to the MS/UE from the fast-setup resources. Periodically, the BSC/RNC 199 adjusts the level of fast-setup resources at each BS/Node B to balance the available resources across all BS/Node B in the communication system 100.

Generally, message integrity is needed for communications of data between a MS/UE and BS/Node B. One or more of the messages communicated between MS/UE and BS/Node B are made without message integrity protection while the MS/UE is acquiring a DPCH. The indication message transmitted from the MS/UE is processed in accordance with a message integrity feature of the communication system. Therefore, the MS/UE may need to generate and process the indication message in accordance with a message integrity process. The message integrity process is known and more detailed in a 3GPP standard outlined as TS 33.102, section 6.5, incorporated by reference herein.

For security feature, MS/UE user data need to be protected. Such a protection is provided through a security feature. Generally, the MS/UE and BSC/RNC process the information in accordance with a data ciphering process for security protection. The security feature process is known and more detailed in a 3GPP standard outlined as TS 33.102, section 6.6, incorporated by reference herein. The security feature may or may not have been set up between the MS/UE and MDC/RNC when the indication message is sent from the MS/UE to BSC/RNC. Generally, the MS/UE may have many different operating modes. The MS/UE may switch from a common channel communication to a dedicated channel communication or may add a dedicated channel communication to an already existing common channel communication. Therefore, there may have been some communications between the MS/UE and BSC/RNC. If the security feature has been enabled at the time of sending the indication message in the messaging flow, the MS/UE may use the ciphering process to provide the security feature for the indication message. Therefore, in accordance with various aspects of the invention, the MS/UE is able to switch from a common channel communication to a dedicated channel communication or may add a dedicated channel communication to an already existing common channel communication in a very quick manner while providing the message integrity and security feature.

Handoff process is a well known and used process in a communication system. Handoff processes are necessary since the MS/UE may be moving from one coverage area to another while maintaining a call connection. There are several types of handoff process. A soft hand off process is a process by which a MS/UE is able to continue receiving communications in a generally non-interruptive manner while the down link communications is being switched from a base station/Node B to another. A softer hand off process is a process by which a MS/UE is able to continue receiving communications in a generally non-interruptive manner while the down link communications is being switched from one sector of a base station/Node B to another sector of the same base station/Node B. A BS/Node B generally controls the availability of resources in all sectors of the BS/Node B. Therefore, the MS/UE may include the information about the channel conditions with various sectors of the BS/Node B in its request message for acquiring a DPCH. The BS/Node B accordingly assigns from the fast-setup resources to setup a DPCH from the best suited sector. After the MS/UE has passed through a successful message integrity process in response to sending the indication message to the BSC/RNC, the BSC/RNC may find that the acquired DPCH may be best suited to be processed by another BS/Node B than the originally used BS/Node B used to set up the DPCH. In such a case, the MS/UE is directed to use the new BS/Node for communication on DPCH. The BSC/RNC may initiate the hand off process from one BS/Node B to another. The resources used to setup a DPCH in the new BS/Node B need not to be from the pool of fast setup resources at the new BS/Node B.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

The invention claimed is:

1. A method for a communication system comprising:
   receiving a notification message from a base station, the notification message informing a base station controller of a mobile station in process of establishing a radio link with the base station;
   starting a timer at the base station controller for measuring elapsed time after receiving the notification message indicating that the mobile station is in process of establishing a radio link; and
   transmitting a radio link release message from the base station controller to the base station in response to detecting expiration of the timer with respect to a timer threshold, the timer expiration indicating failure of the mobile station to acquire a channel from the base station within the timer threshold.

2. The method as recited in claim 1 further comprising:
   receiving an indication message from the mobile station at the base station controller indicating successful acquisition of a data packet channel by the mobile station.

3. The method as recited in claim 2 further comprising:
   processing the indication message for message integrity at the base station controller.

4. The method as recited in claim 3 further comprising:
   transmitting a radio link release message from the base station controller to the base station in response to detecting a failure of the mobile station in passing the processing for message integrity.

5. The method as recited in claim 2 further comprising:
   processing the indication message for security feature at the base station controller.

6. The method as recited in claim 5 further comprising:
   transmitting a radio link release message from the base station controller to the base station in response to detecting a failure of the mobile station in passing the processing for security feature.

7. An apparatus for a communication system comprising:
   means for receiving a notification message from a base station, the notification message informing a base station controller of a mobile station in process of establishing a radio link with the base station;
   means for starting a timer at the base station controller for measuring elapsed time after receiving the notification message indicating that the mobile station is in process of establishing a radio link; and
   means for transmitting a radio link release message from the base station controller to the base station in response to detecting expiration of the timer with respect to a timer threshold, the timer expiration indicating failure of the mobile station to acquire a channel from the base station within the timer threshold.

8. The apparatus as recited in claim 7, further comprising:
   means for receiving an indication message from the mobile station at the base station controller indicating successful acquisition of a data packet channel.

9. The apparatus as recited in claim 8 further comprising:
   means for processing the indication message for message integrity at the base station controller.

10. The apparatus as recited in claim 9 further comprising:
    means for transmitting a radio link release message from the base station controller to the base station in response to detecting a failure of the mobile station in passing the processing for message integrity.

11. The apparatus as recited in claim 8 further comprising:
    means for processing the indication message for security feature at the base station controller; and
    means for transmitting a radio link release message from the base station controller to the base station in response to detecting a failure of the mobile station in passing the processing for security feature.

12. An apparatus for a communication system, comprising:
    at least one processor operative to receive a notification message from a base station, the notification message informing a base station controller of a mobile station in process of establishing a radio link with the base station, to start a tinier at the base station controller for measuring elapsed time after receiving the notification message indicating that the mobile station is in process of establishing a radio link, and to send a radio link release message from the base station controller to the base station in response to detecting expiration of the timer with respect to a timer threshold, the timer expiration indicating failure of the mobile station to acquire a channel from the base station within the timer threshold.

13. The apparatus as recited in claim 12, wherein the at least one processor is operative to receive an indication message from the mobile station at the base station controller indicating successful acquisition of a data packet channel.

14. The apparatus as recited in claim 13, wherein the at least one processor is operative to process the indication message for message integrity at the base station controller.

15. The apparatus as recited in claim 14, wherein the at least one processor is operative to send a radio link release message from the base station controller to the base station in response to detecting a failure of the mobile station in passing the processing for message integrity.

16. The apparatus as recited in claim 13, wherein the at least one processor is operative to process the indication message for security feature at the base station controller, and to send a radio link release message from the base station controller to the base station in response to detecting a failure of the mobile station in passing the processing for security feature.

17. The apparatus as recited in claim 12, further comprising:
    a communication unit coupled to the at least one processor and operative to receive the notification message from the base station and to send the radio link release message to the base station.

18. A computer-readable medium encoded with a computer program for a communication system, comprising instructions for receiving a notification message from a base station, the notification message informing a base station controller of a mobile station in process of establishing a radio link with the base station;

starting a timer at the base station controller for measuring elapsed time after receiving the notification message indicating that the mobile Station is in process of establishing a radio link; and sending a radio link release message from the base station controller to the base station in response to detecting expiration of the timer with respect to a timer threshold, the timer expiration indicating failure of the mobile station to acquire a channel from the base station within the timer threshold.

* * * * *